Patented Apr. 13, 1943

2,316,745

UNITED STATES PATENT OFFICE 2,316,745

CERAMIC DECORATING COMPOSITION

Campbell Robertson and Alden J. Deyrup, Westfield, N. J., assignors to E. I. du Pont de Nemours & Company, Wilmington, Del., a corporation of Delaware No Drawing. Application June 12, 1941, Serial No. 397,818

9 Claims. (Cl. 106—48)

This invention relates to new and improved ceramic decorating compositions, more particularly suspensions of a ceramic glaze or enamel in a suitable vehicle. It also relates to certain new and improved vehicles suitable for suspending vitrifiable enamel decorating compositions, for use in methods wherein the vitrifiable enamel suspended in the medium is applied to the ceramic ware to be decorated by spraying, squeegee methods, or other methods of application.

In the decorating of ceramic articles, for example glassware articles, with a vitrifiable glaze or enamel coating composition, the enamel in the form of a dry powder is first suspended in a suitable liquid vehicle to form a slip or paint which can be applied to the surface of the ceramic ware over the particular areas which it is intended to decorate. The ware is then passed through a heated lehr, or heated by other means, in order to fuse the vitrifiable enamel in place on the article. The glossy decorative enamel coating is thus formed on the surface of the article.

The suspension of finely powdered vitrifiable glaze is usually applied to the article to be decorated by spraying, by stenciling, by squeegee methods, or by other suitable procedures well known in the art. In order that these methods may give uniformly satisfactory results, it is essential that the liquid suspending medium or vehicle possess certain desired properties. The preparation of liquid media suitable for use as vehicles to suspend ceramic decorating compositions has constituted a distinct problem in the art of ceramic decoration. Our improved vehicles comply with the exacting standards set up for suspension liquids of the most satisfactory character, and the new media forming the subject matter of our invention have received widespread acceptance in the industry.

Among the properties essential in a satisfactory vehicle, the ability to form a firm and rigid temporary bond with the ceramic ware being decorated before the article is fired to fuse the enamel in place thereon is an important one. Firm adhesion between vitrifiable glaze composition and the article, after the ceramic decorating composition has been applied thereto by spraying, squeegee, or other methods, is important in that it permits handling the ware without danger of damage thereto before the article is heated to fuse the vitrifiable glaze on the surface being decorated.

At the same time a satisfactory vehicle for suspending vitrifiable ceramic decorating compositions must possess good general spraying properties and other allied properties incident to ease of applying it to the ceramic ware by any of the usual methods. But perhaps the most important requirement of a satisfactory vehicle relates to its behavior during the firing of the vitrifiable enamel. During the process of fusing the enamel in place on the article it is essential that the vehicle disappear cleanly, without depositing carbon residues on the surface of the ceramic ware, and without the formation of bubbles, blisters, or other surface defects which would be visible on the completed article and mar its surface. These rigid requirements, especially the requirement that the vehicle shall disappear cleanly, without leaving behind imperfections marring the finished glaze surface, have rendered the problem of producing a satisfactory vehicle a difficult one. Vehicles now available in the industry do not satisfactorily meet all requirements, some of the media now available being deficient in properties during the firing, while others exhibit unsatisfactory adhesive properties.

It is one of the objects of this invention to develop an improved vehicle for suspending decorative vitrifiable glaze compositions, which vehicle will possess the properties hereinbefore described as requisite in such a vehicle to a nearly ideal degree. Another object of this invention is to prepare improved ceramic paint compositions or slips, comprising a vitrifiable color composition suspended in our improved media, which ceramic paints can be used to decorate ceramic ware by any of the usual methods. The ceramic slip or paint compositions incorporating our new vehicles exhibit the improved characteristics incident to the use of our novel media. These and still other objects of our invention will be apparent from the ensuing disclosure of certain preferred embodiments thereof.

Our improved vehicles for suspending ceramic color compositions are characterized by the presence therein of methyl cellulose. We have made the surprising discovery that methyl cellulose used as a component of vehicles for this type of application contributes at one and the same time excellent bonding properties before firing and an ease of disappearance during the firing which is incomparably better than that of any other bonding material. For example, it has been proposed in this art to use as bonding materials a great variety of substances: water-soluble gums, such as gum tragacanth, gum arabic, gum karaya, soluble borates and phosphates, and viscous liquids such as glycerine. The latter bonding material, glycerine, is one of the best, but although this is a liquid boiling at 290° C., it nevertheless fails many times to disappear cleanly in the firing of the ware, and frequently is the cause of blisters and other defects. This is especially apt to happen if the decorating lehr is crowded or has a bad atmosphere. In contrast, we have found that methyl cellulose, although it is not volatile at all, surprisingly has the property of disappearing cleanly and leaving no defects in the fired ware, even though the lehr may be very crowded.

In addition to the methyl cellulose, a volatile solvent of some type is present, especially where rate of drying is important as, for example, when the vitrifiable glaze is intended to be applied by spraying. While we have secured very satisfactory results with methyl alcohol as the solvent, other suitable volatile solvents may be utilized with equal success.

Our improved vehicles also usually contain a flocculating agent, i. e., an agent to control the degree of dispersion of the solid particles of vitrifiable glaze in the paint composition. Various inorganic salts may be utilized for this purpose, and we ordinarily prefer to use potassium nitrite. Water in greater or less amount is also ordinarily present, serving as a solvent for the inorganic salt present in the composition as flocculating agent.

A typical improved ceramic vehicle exhibiting the superior properties characteristic of our new media containing methyl cellulose may consist, for example, of methyl cellulose 0.50%; potassium nitrite 0.75%; methyl alcohol 31.0%; and water 67.75%. We have found that the amount of methyl cellulose present in the composition should range from 0.1% to 2.0% in order that improved results of the highest character may be obtained. The amount of inorganic salt flocculating agent, for example potassium nitrite, may advantageously range from 0.2% to 2.0%. All percentages are by weight, based on the weight of the total composition.

The vehicle may be mixed with the dry vitrifiable ceramic color composition in any suitable manner, such for example as by the use of a burr mill, a ball mill, or a colloid mill. For example, 70 parts by weight of a typical low-melting vitrifiable glass enamel may be mixed with 30 parts by weight of the vehicle and the mixture passed through a colloid mill. This yields a smooth slip or ceramic paint composition suitable for direct utilization in decorating articles of ceramic ware.

Our improved vehicles containing methyl cellulose, suitable for suspending vitrifiable glaze compositions, are particularly adapted for preparing ceramic paints or slips which are intended to be applied to the article to be decorated by spraying. However, the vehicles may also be used for suspending vitrifiable enamels intended to be applied to the ware by other well-known methods. Thus they are very satisfactory vehicles when the glaze is applied by squeegee methods or when stencil methods are employed.

We have found that the methyl alcohol present in our new and improved vehicles serves to adjust the rate of drying, in this way permitting the securement of rapid results when the slip is applied by spraying methods. The methyl cellulose present in the solvent is the element essentially responsible for uniting in a single composition both good burning and good bonding properties.

As many changes may be made in our improved vehicles and improved ceramic paint compositions containing these vehicles without departing from the scope of the invention, it is our intention that its scope shall not be restricted to embodiments described herein as merely illustrative, but shall be interpreted in accordance with the prior art and appended claims.

We claim:

1. A ceramic paint composition comprising a vitrifiable enamel composition suspended in a vehicle containing methyl cellulose.

2. A ceramic paint composition comprising a low-melting vitrifiable glaze suspended in an aqueous medium containing methyl cellulose.

3. A ceramic paint composition comprising a finely-divided vitrifiable enamel composition suspended in a vehicle containing methyl cellulose, water, and an inorganic salt flocculating agent.

4. A ceramic slip comprising a finely-divided vitrifiable enamel composition suspended in a vehicle which comprises methyl cellulose, water, a volatile solvent, and an inorganic salt flocculating agent.

5. A ceramic slip comprising a finely-divided vitrifiable enamel suspended in a vehicle comprising methyl cellulose, methyl alcohol, and potassium nitrite.

6. A ceramic paint comprising a finely-divided vitrifiable color composition suspended in a vehicle containing methyl cellulose, methyl alcohol, water, and potassium nitrite.

7. A ceramic slip comprising a vitrifiable color composition suspended in a vehicle having substantially the following ingredients: methyl cellulose 0.1 to 2.0%; potassium nitrite 0.2 to 2.0%; water and methyl alcohol.

8. A ceramic slip comprising a finely-divided vitrifiable enamel composition suspended in a vehicle having substantially the following composition: methyl cellulose 0.1 to 2.0%; potassium nitrite 0.2 to 2.0%; water and methyl alcohol.

9. A ceramic slip comprising a finely-divided vitrifiable enamel composition suspended in a vehicle having substantially the following composition: methyl cellulose 0.50%; potassium nitrite 0.75%; methyl alcohol 30%, and water.

CAMPBELL ROBERTSON.
ALDEN J. DEYRUP.